(12) United States Patent
Shin et al.

(10) Patent No.: US 9,076,243 B2
(45) Date of Patent: Jul. 7, 2015

(54) DIGITAL INTERIOR SYSTEM AND METHOD FOR CONTROLLING THE SAME

(75) Inventors: Hyun Soon Shin, Daejeon (KR); Intark Han, Daejeon (KR); Yong Kwi Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 431 days.

(21) Appl. No.: 13/074,959

(22) Filed: Mar. 29, 2011

(65) Prior Publication Data

US 2011/0246072 A1    Oct. 6, 2011

(30) Foreign Application Priority Data

Mar. 30, 2010   (KR) ................... 10-2010-0028741
Aug. 6, 2010   (KR) ................... 10-2010-0076126

(51) Int. Cl.
  *G06T 19/00*   (2011.01)
  *G06F 19/00*   (2011.01)
  *E04B 1/35*   (2006.01)

(52) U.S. Cl.
  CPC . *G06T 19/00* (2013.01); *E04B 1/35* (2013.01); *G06T 2210/04* (2013.01)

(58) Field of Classification Search
  CPC ... G06F 13/00; G06F 17/5004; G06F 1/1601; G06T 2210/04; Y10S 362/801; Y10S 362/806
  USPC .......................................................... 702/1
  See application file for complete search history.

(56) References Cited

U.S. PATENT DOCUMENTS

| | | | | |
|---|---|---|---|---|
| 4,754,372 A * | 6/1988 | Harrison | ....................... | 362/565 |
| 6,256,811 B1 * | 7/2001 | Nelson | ............... | 5/53.1 |
| 7,251,783 B2 * | 7/2007 | Jackson et al. | ................ | 715/726 |
| 7,505,044 B2 * | 3/2009 | Bowsher et al. | .............. | 345/594 |
| 2006/0184325 A1 * | 8/2006 | Orfield | ............... | 702/1 |
| 2008/0281561 A1 * | 11/2008 | Shulman et al. | .................. | 703/1 |

FOREIGN PATENT DOCUMENTS

| | | |
|---|---|---|
| JP | 08-220980 A | 8/1996 |
| JP | 2001-155179 A | 6/2001 |
| KR | 10-0785332 B1 | 12/2007 |
| KR | 102008002187 A | 1/2008 |
| KR | 1020080067854 A | 7/2008 |
| KR | 10-0867362 B1 | 11/2008 |
| KR | 1020090016055 A | 2/2009 |
| KR | 10-2009-0063063 A | 6/2009 |

* cited by examiner

*Primary Examiner* — Eliseo Ramos Feliciano
*Assistant Examiner* — Terence Stifter, Jr.

(57) ABSTRACT

A digital interior system includes a sensitivity-space-environment detection engine for collecting sensitivity information, space related information, or environmental information about an interior space. Further, the digital interior system includes an interior content generation system for generating interior content about each of objects in the interior space based on the sensitivity information, space related information or environmental information collected by the sensitivity-space-environment detection engine. Furthermore, the digital interior system includes a digital interior construction system for performing interior construction using each of pieces of interior content generated by the interior content generation system.

12 Claims, 12 Drawing Sheets

DIGITAL INTERIOR SYSTEM AND METHOD FOR CONTROLLING THE SAME

CROSS-REFERENCE TO RELATED APPLICATIONS

The present invention claims priority of Korean Patent Application No. 10-2010-0028741, filed on Mar. 30, 2010, and Korean Patent Application No. 10-2010-0076126, filed on Aug. 6, 2010, which are incorporated herein by references.

FIELD OF THE INVENTION

The present invention relates to a digital interior system and a method for controlling the same; and, particularly, to a digital interior system, which collects information necessary for an interior by sensing an interior space, generates interior content based on the collected information, and performs digital construction using the generated interior content, and a method of controlling the same.

BACKGROUND OF THE INVENTION

With the development of IT technology, the living environment and the housing environment have rapidly improved. Accordingly, issues related to the energy and the environment have surfaced, and research and development for low carbon, green growth has become necessary. Therefore, a lot of research has been ongoing, but the research is yet in the initial stages.

Particularly, industrial and construction waste has increased because of the desire to frequently change the interior of a house to suit the sensitivity and taste of individuals and the desire to improve individual quality of life, and because of the periodical remodeling of shopping districts in order to satisfy customers. Therefore, a new paradigm of construction (interior) technology capable of reducing expensive interior costs to construct a green environment and a method for reusing construction materials are both required.

SUMMARY OF THE INVENTION

In view of the above, the present invention provides a digital interior system which designs the interior of a space suitable for the sensitivity and taste of a user using digital Information Technology (IT) technology, and which generates interior content, thereby performing interior construction using a computer, and a method of controlling the same.

Further, the present invention provides a digital interior system which senses an interior space using digital technology and generates interior content based on the sensed interior space, and then performs interior construction in a digital fashion using IT integrated materials, e.g., wallpaper, linoleum, glass, lighting, display device and the like based on the generated interior content, thereby reducing construction waste and decorating the interior at low expense, and a method for controlling the same.

In accordance with a first aspect of the present invention, there is provided a digital interior system including: a sensitivity-space-environment detection engine for collecting sensitivity information, space related information, or environmental information about an interior space; an interior content generation system for generating interior content about each of objects in the interior space based on the sensitivity information, space related information or environmental information collected by the sensitivity-space-environment detection engine; and a digital interior construction system for performing interior construction using each of pieces of interior content generated by the interior content generation system.

In accordance with a second aspect of the present invention, there is provided a method for controlling a digital interior system, the method including: collecting sensitivity information, space related information, or environmental information by sensing an interior space; generating interior content for each of objects in the interior space based on the collected sensitivity information, space related information, or environmental information; and performing interior construction using each generated piece of interior content.

In accordance with an embodiment of the present invention, there is provided a new paradigm of a digital interior system capable of performing interior construction at the desired time and with the desired interior content of a user depending on the sensitivity or tastes of the user. Accordingly, it is advantageous to establish a green environment because construction waste can be reduced, as well as to improve the quality of life and reuse materials.

BRIEF DESCRIPTION OF THE DRAWINGS

The objects and features of the present invention will become apparent from the following description of preferred embodiments given in conjunction with the accompanying drawings, in which.

DETAILED DESCRIPTION OF THE EMBODIMENTS

Hereinafter, embodiments of the present invention will be described in detail with reference to the accompanying drawings which form a part hereof.

Figure 1:
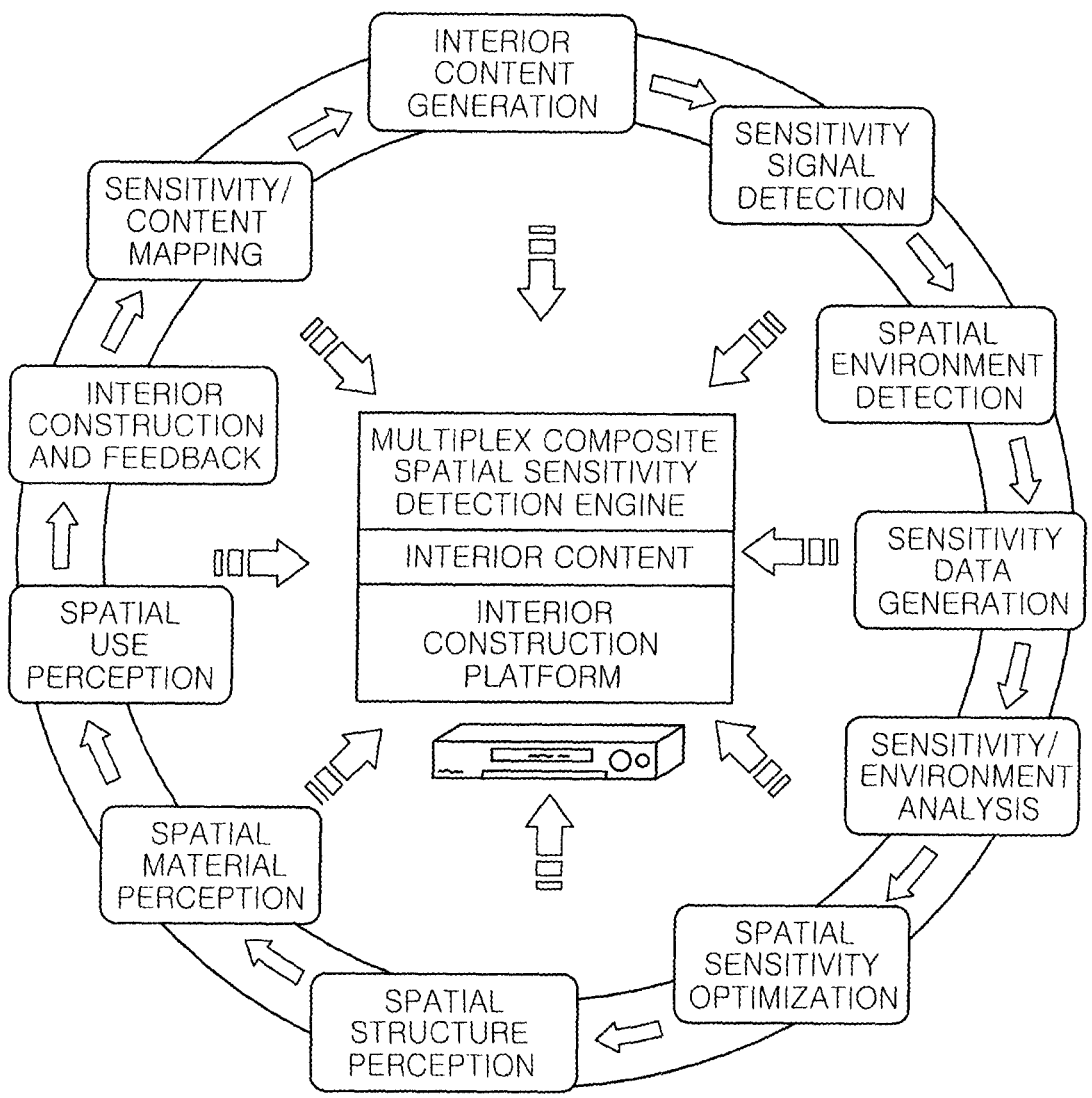
FIG. 1 is a conceptual view showing the configuration of a digital interior system in accordance with an embodiment of the present invention.

FIG. 1 is a conceptual view showing the configuration of a digital interior system in accordance with an embodiment of the present invention. The digital interior system includes a multiplex composite spatial sensitivity detection engine configured to sense an interior space, one or more pieces of interior content generated by sensing the interior space, and an interior construction platform configured to perform interior construction based on the interior content, which are based on sensitivity signal detection, spatial environment detection, sensitivity data generation, sensitivity/environmental analysis, spatial sensitivity optimization, spatial structure perception, spatial material perception, spatial use perception, interior content generation, sensitivity/content mapping, interior construction and feedback.

Figure 2:
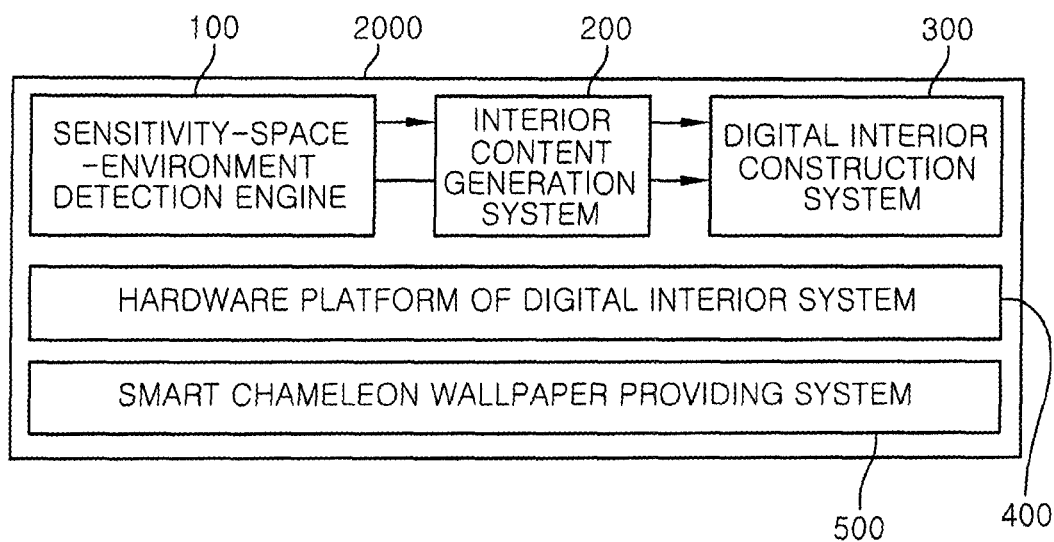
FIG. 2 is a schematic diagram of a sub system showing the configuration of the digital interior system in accordance with the embodiment of the present invention.

FIG. 2 is a schematic diagram of a sub system showing the configuration of the digital interior system in accordance with the embodiment of the present invention.

Referring to FIG. 2, the digital interior system in accordance with the embodiment of the present invention is applied to interior construction services for houses, places of business and shopping districts. For this purpose, the digital interior system includes a sensitivity-space-environment detection engine 100, an interior content generation system 200, a digital interior construction system 300, a digital interior system hardware platform 400 and a smart chameleon wallpaper providing system.

Figure 3:
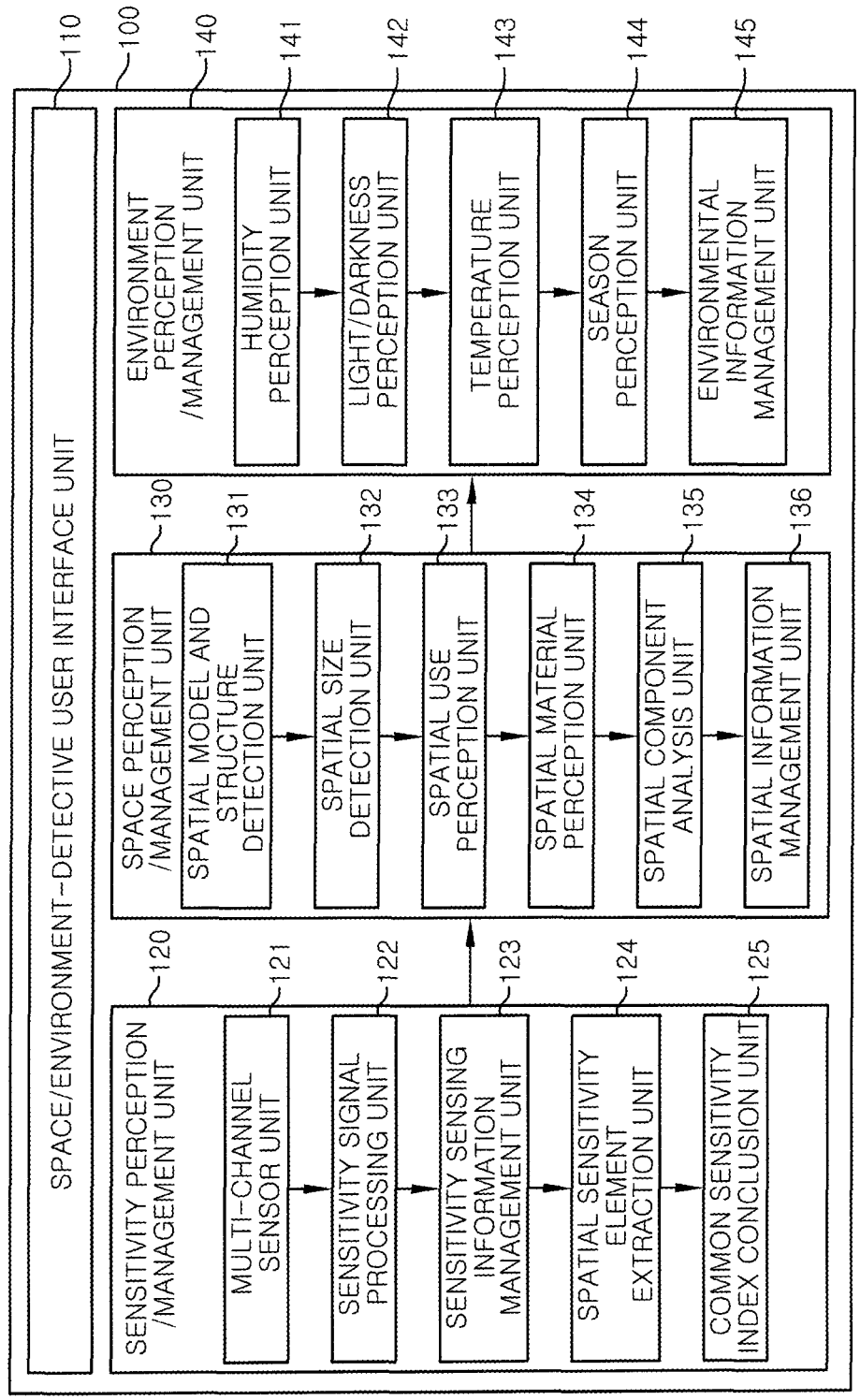
FIG. 3 is a block diagram showing the inner configuration of the sensitivity-space-environment detection engine of the digital interior system in accordance with the embodiment of the present invention.

The sensitivity-space-environment detection engine 100 is used to collect sensitivity information, space related information, and environmental information about an interior space. For this purpose, the sensitivity-space-environment detection engine 100 includes a space/environment-detective user interface unit 110, a sensitivity perception/management unit 120, a space perception/management unit 130, and an environment perception/management unit 140, as shown in FIG. 3.

The sensitivity perception/management unit 120 senses the interior space, extracts an individual sensitivity index for each of the objects constituting the interior space using the sensed results, and then extracts a common sensitivity index using the extracted individual sensitivity index. Here, the individual sensitivity index and the common sensitivity index may be managed as the sensitivity information about the interior space by the sensitivity perception/management unit 120.

Here, the sensitivity perception/management unit 120 includes a multi-channel sensor unit 121 for sensing the interior space to collect one or more sensitivity signals of the interior space, a sensitivity signal processing unit 122 for processing the collected sensitivity signals of the interior space, a sensitivity sensing information management unit 123 for analyzing the processed sensitivity signals, and extracting one or more elements which affect the interior space to manage the elements, a spatial sensitivity element extraction unit 124 for extracting the individual sensitivity index for each of the objects in the interior space using the elements managed by the sensitivity sensing information management unit 123, and a common sensitivity index conclusion unit 125 for extracting the common sensitivity index about the interior space based on the individual sensitivity index, to manage the individual sensitivity index and the common sensitivity index as the sensitivity information.

The process in which the sensitivity perception/management unit 120 having the configuration described above, operates and then senses to perceive the sensitivity of the interior space will be described with reference to FIG. 4.

Figure 4:
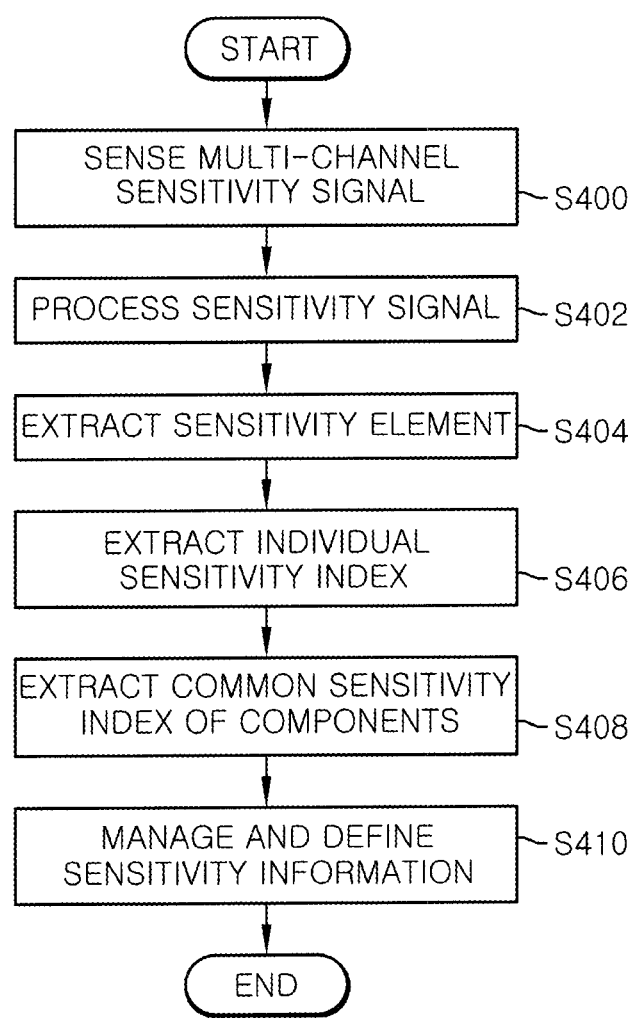
FIG. 4 is a flow chart showing the process in which the digital interior system in accordance with the embodiment of the present invention senses and perceives the sensitivity of an interior space.

As shown in FIG. 4, the multi-channel sensor unit 121 senses the sensitivity signal of the space in step S400, and provides the sensed sensitivity signal of the space to the sensitivity signal processing unit 122, and the sensitivity signal processing unit 122 processes the sensed sensitivity signal in step S402, and provides the processed sensitivity signal to the spatial sensitivity element extraction unit 124.

The spatial sensitivity element extraction unit 124 extracts one or more elements that affect spatial sensitivity by analyzing the sensitivity signal in step S404, extracts the individual sensitivity index of the objects constituting the space in step S406, and then provides the individual sensitivity index to the common sensitivity index conclusion unit 125.

The common sensitivity index conclusion unit 125 extracts the common sensitivity index of one or more components in the interior space, which can be used to conclude the spatial sensitivity, based on the individual sensitivity index received from the spatial sensitivity element extraction unit 124 in step S408. The extracted common sensitivity index and the individual sensitivity index are managed by the sensitivity sensing information management unit 123 as sensitivity information in step S410.

The space perception/management unit 130 detects the model and structure of the interior space by sensing information about the structure and configuration of the interior space, and collects space related information using the detected model and structure. For this purpose, the space perception/management unit 130 includes a spatial model and structure detection unit 131 for detecting the model and structure of a space, a spatial size detection unit 132 for detecting the size of the space, a spatial use perception unit 133 for perceiving the use of the space, a spatial material perception unit 134 for perceiving the material of the space, a spatial component analysis unit 135 for analyzing perceived elements, i.e., a model, structure, a size, use and materials to define the use, structure, size, material, height, and width of the interior space, and a spatial information management unit 136 for managing the perceived elements and the defined elements.

Figure 5:
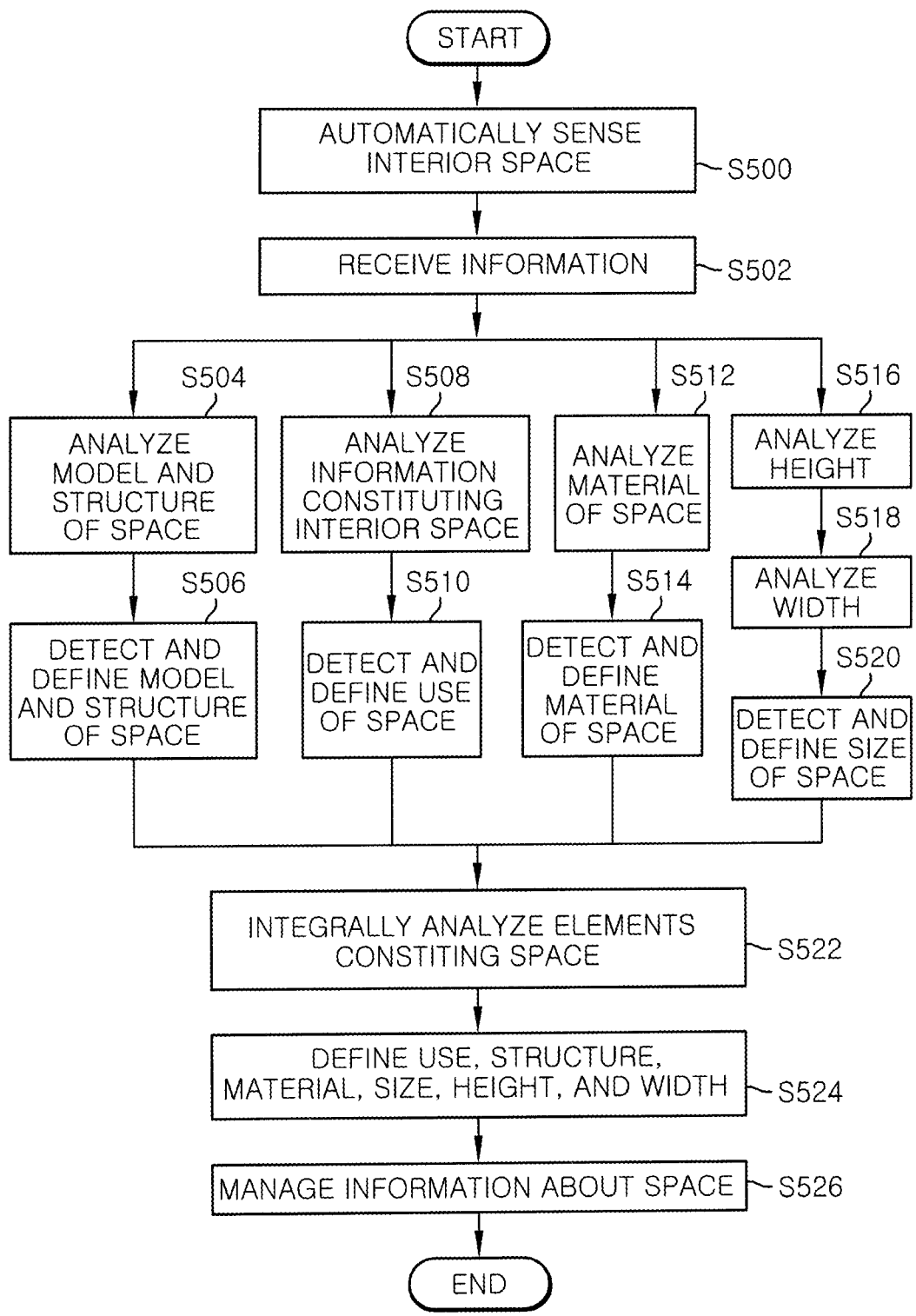
FIG. 5 is a flow chart showing the process in which a space perception/management unit in accordance with the embodiment of the present invention generates space related information.

FIG. 5 is a flow chart showing the process in which the space perception/management unit in accordance with the embodiment of the present invention generates the space related information.

As shown in FIG. 5, the space perception/management unit 130 first automatically senses the information about the structure and configuration of an interior space using the multi-channel sensor unit 121 in step S500, and then receives the information about the structure and configuration of the interior space using the space/environment detective user interface unit 110 in step S502.

Thereafter, the space perception/management unit 130 analyzes information constituting the interior space using the sensed and received information in step S504, detects and defines the model and structure of the space in step S506, analyzes the information constituting the interior space based on the input information in step S508, and detects and defines the use of the space in step S510.

Thereafter, the space perception/management unit 130 analyzes materials constituting the space based on the sensed information in step S512, detects and defines one or more interior materials which will constitute the interior space by analyzing interior materials to be added based on the received information in step S514.

Thereafter, the space perception/management unit 130 analyzes the height and width of the interior space based on the sensed and received information in steps S516 and S518, and detects and defines the size of the interior space in step S520.

Thereafter, the space perception/management unit 130 integrally analyzes the elements constituting the space based on the detected and defined information in step S522, and defines the use, structure, materials, size, height, and width of one or more interior targets in step S524.

The space related information perceived and defined by the above-described processes is stored and managed by the spatial information management unit 136 in step S526.

The environment perception/management unit 140 senses one or more environmental signals of the interior space and collects information about the environment of the interior space. For this purpose, the environment perception/management unit 140 includes a humidity perception unit 141 for perceiving the humidity of the environment inside the space, a light/darkness perception unit 142 for perceiving the brightness and luminous intensity of the space, a temperature perception unit 143 for perceiving temperature, a season perception unit 144 for perceiving the season, and an environmental information management unit 145 for managing perceived environmental information.

Figure 6:
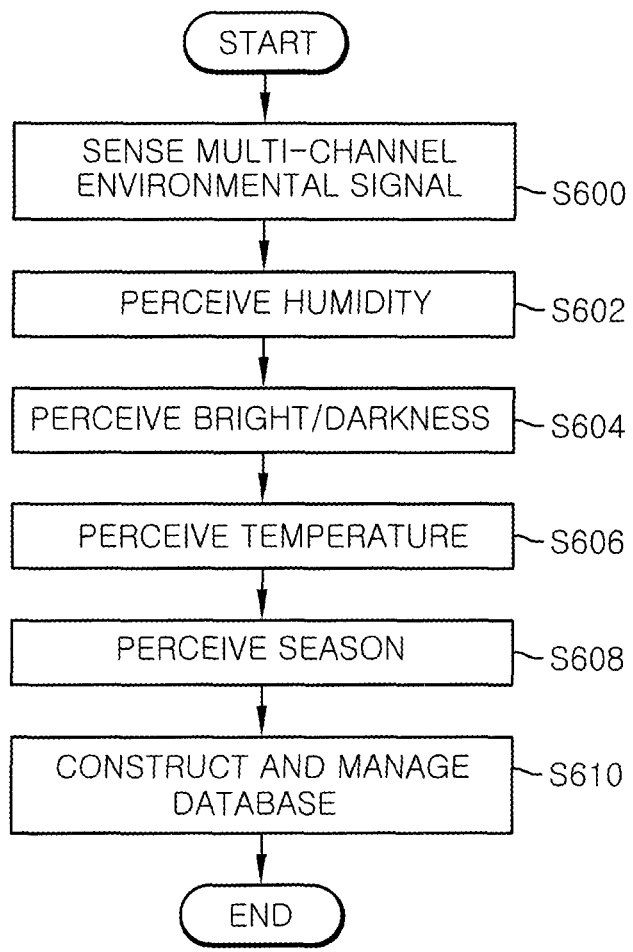
FIG. 6 is a flow chart showing the process of sensing and perceiving the environment of an interior space in accordance with the embodiment of the present invention.

FIG. 6 is a flow chart showing the process of sensing and perceiving the environment of the interior space in accordance with the embodiment of the present invention.

Referring to FIG. 6, the multi-channel sensor unit 121 first senses one or more environmental signals of a space, and then processes the environmental signals in step S600. Here, the environmental signals sensed by the multi-channel sensor unit 121 of the sensitivity perception/management unit 120 are provided to the environment perception/management unit 140 through the space and environment detection interface unit 110.

Thereafter, the environment perception/management unit 140 perceives the humidity of the space using the humidity perception unit 141 in step S602, and perceives the degree of the light/darkness and brightness of the space using the light/darkness perception unit 142 in step S604.

Thereafter, the environment perception/management unit 140 perceives the temperature that affects the image and color of the interior of the space using the temperature perception unit 143 at step S606, and perceives the season using the season perception unit 144 in step S608. The information about the perceived humidity, light/darkness, brightness, temperature, and season of the space is provided to the environmental information management unit 145, and the environmental information management unit 145 constructs and manages a database based on the perceived information in step S610.

Figure 7:
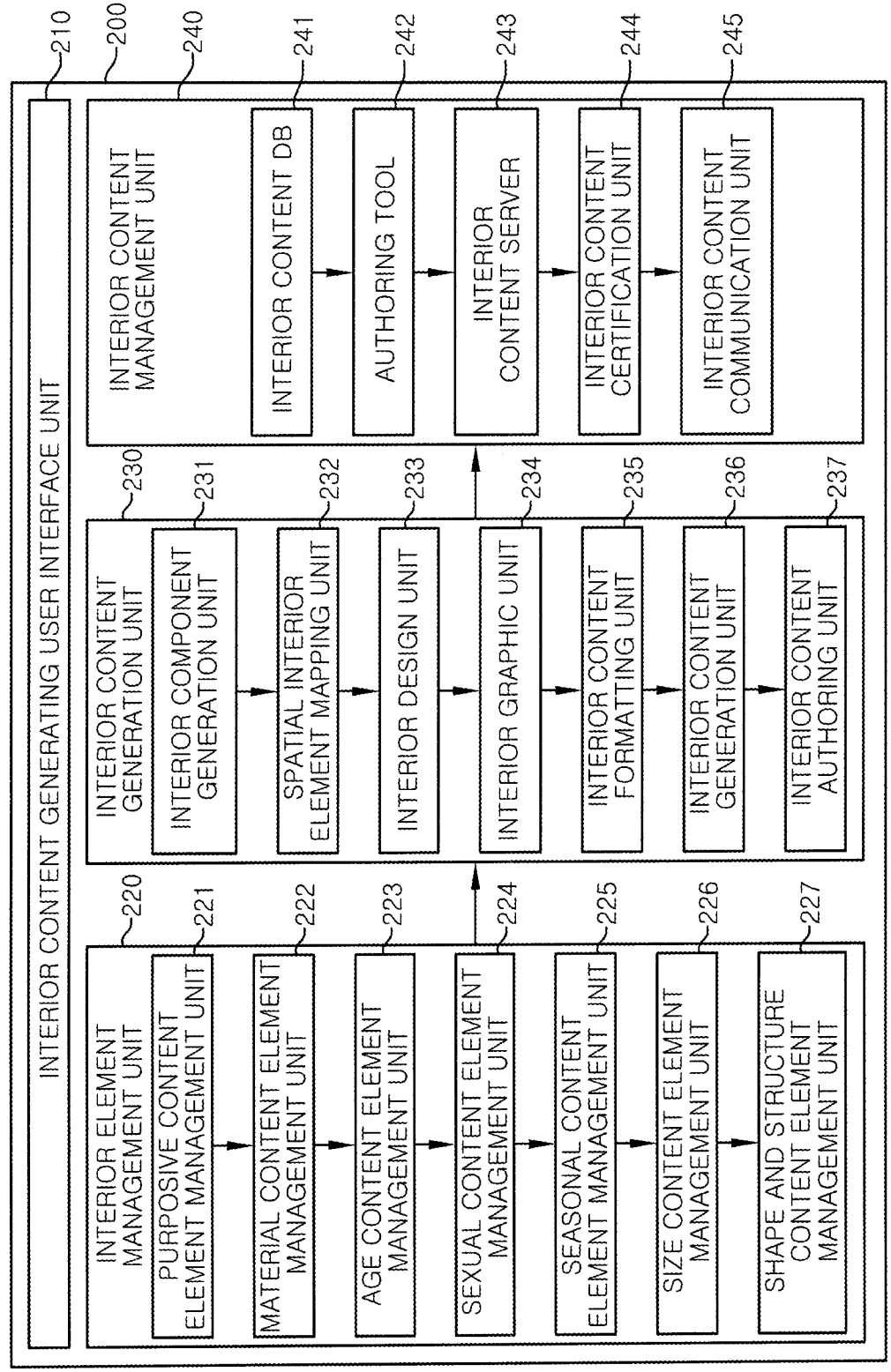
FIG. 7 is a block diagram showing the inner configuration of the interior content generation system of the digital interior system in accordance with the embodiment of the present invention.

The interior content generation system 200 generates interior content for each of the objects inside of the interior space based on the sensitivity information, the space related information, and the environmental information collected by the sensitivity-space-environment detection engine 100. For this purpose, as shown in FIG. 7, the interior content generation system 200 includes an interior content generating user interface unit 210 for generating interior content, an interior element management unit 220 for constructing and managing one or more elements required for the interior of the space, an interior content generation unit 230 for generating and manufacturing the interior content based on the elements constituting the interior of the space, and an interior content management unit 240 for storing and transmitting the generated interior content.

The interior element management unit 220 includes a purposive content element management unit 221 for managing one or more purposive content elements from among elements required for the interior of the space; a material content element management unit 222 for managing one or more material content elements from among elements required for the interior of the space; an age content element management unit 223 for managing one or more age content elements from among elements required for the interior of the space; a sexual content element management unit 224 for managing one or more sexual content elements from among elements required for the interior of the space; a seasonal content element management unit 225 for managing one or more seasonal content elements from among elements required for the interior of the space; a size content element management unit 226 for managing one or more size content elements from among elements required for the interior of the space; and a shape and structure content element management unit 227 for managing one or more shape and structure content elements from among elements required for the interior of the space.

The interior content generation unit 230 includes an interior component generation unit 231 for generating one or more interior components required to generate the interior content; a spatial interior element mapping unit 232 and an interior design unit 233 for designing the shapes, expressions, colors, or images of the objects in the interior space by targets; an interior graphic unit 234 for performing a graphic process based on content designed by the interior design unit 233; an interior content formatting unit 235 for defining the format of the interior content; an interior content generation unit 236 for generating the interior content for each of the objects based on the defined format; and an interior content authoring unit 237 for authoring the generated interior content for each of the objects into interior content suitable for the interior space using a predefined authoring tool.

The interior content management unit 240 include an interior DB 241 for storing and managing the interior content; an authoring tool 242 for generating the interior content; an interior content server 243 for controlling the storage and transmission of the interior content; an interior content certification unit 244 for managing the interior content so that the interior content is provided only to authorized people; and an interior communication unit 245 for stably transmitting the interior content.

Figure 8:
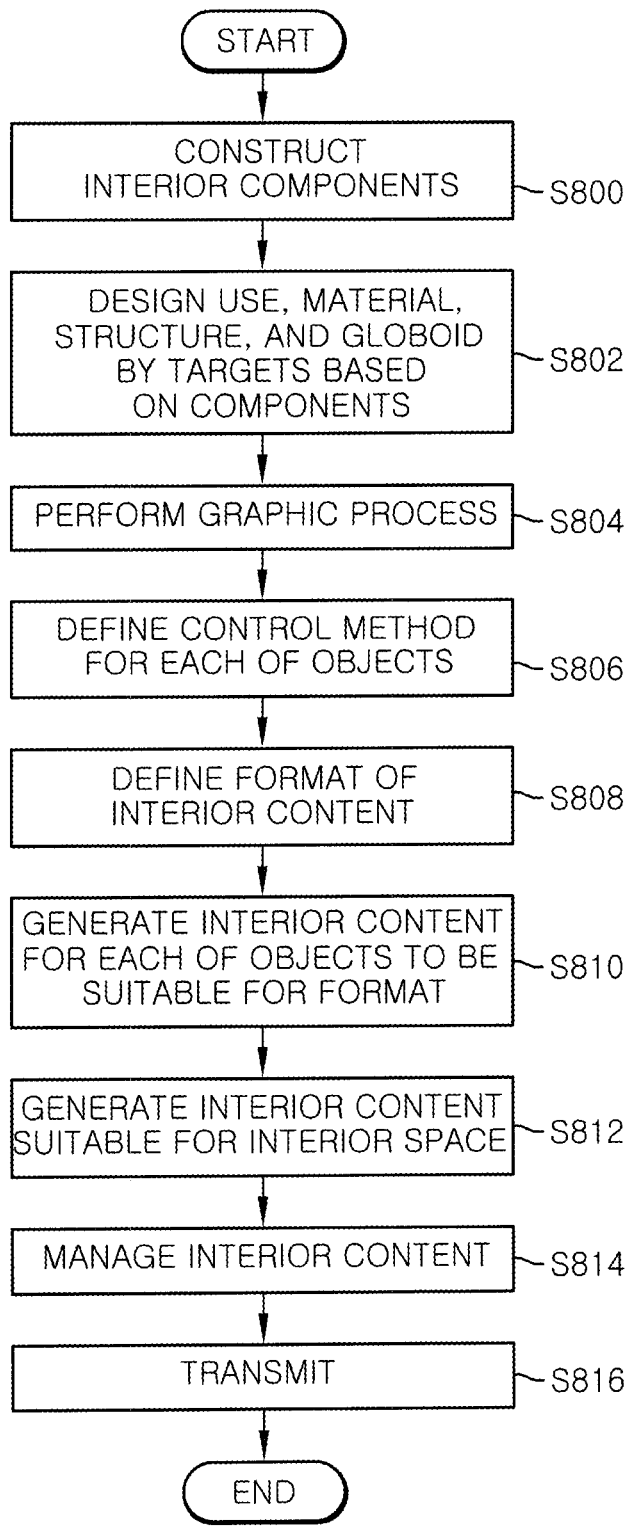
FIG. 8 is a flow chart showing the process in which the interior content generation system in accordance with the embodiment of the present invention generates interior content.

FIG. 8 is a flow chart showing the process in which the interior content generation system in accordance with the embodiment of the present invention generates the interior content.

As shown in FIG. 8, the interior content generation system 200 first constructs interior components required to generate the interior content based on the sensitivity information, space related information and environmental information, which are pieces of information about the interior configuration collected by the sensitivity-space-environment detection engine 100 in step S800, designs the shapes, expressions, colors, and images of the objects constituting the space by targets, e.g., by use, materials, structures, and globoids in step S802, and graphically processes the designed content in step S804.

Thereafter, the interior content generation system 200 defines a control method for each of the objects in the interior space in step S806, defines the format of the interior content in step S808, and generates the interior content for each of the objects based on the defined interior format in step S810.

Thereafter, the interior content generation system 200 processes the generated interior content for each of the objects as interior content suitable for the interior space using a preset authoring tool in step S812.

Thereafter, the interior content generated in step S812 is stored in and managed by the interior content server 243 in step S814, and then transmitted to the outside at the request of a user via the interior content communication unit 245 in step S816.

Figure 9:
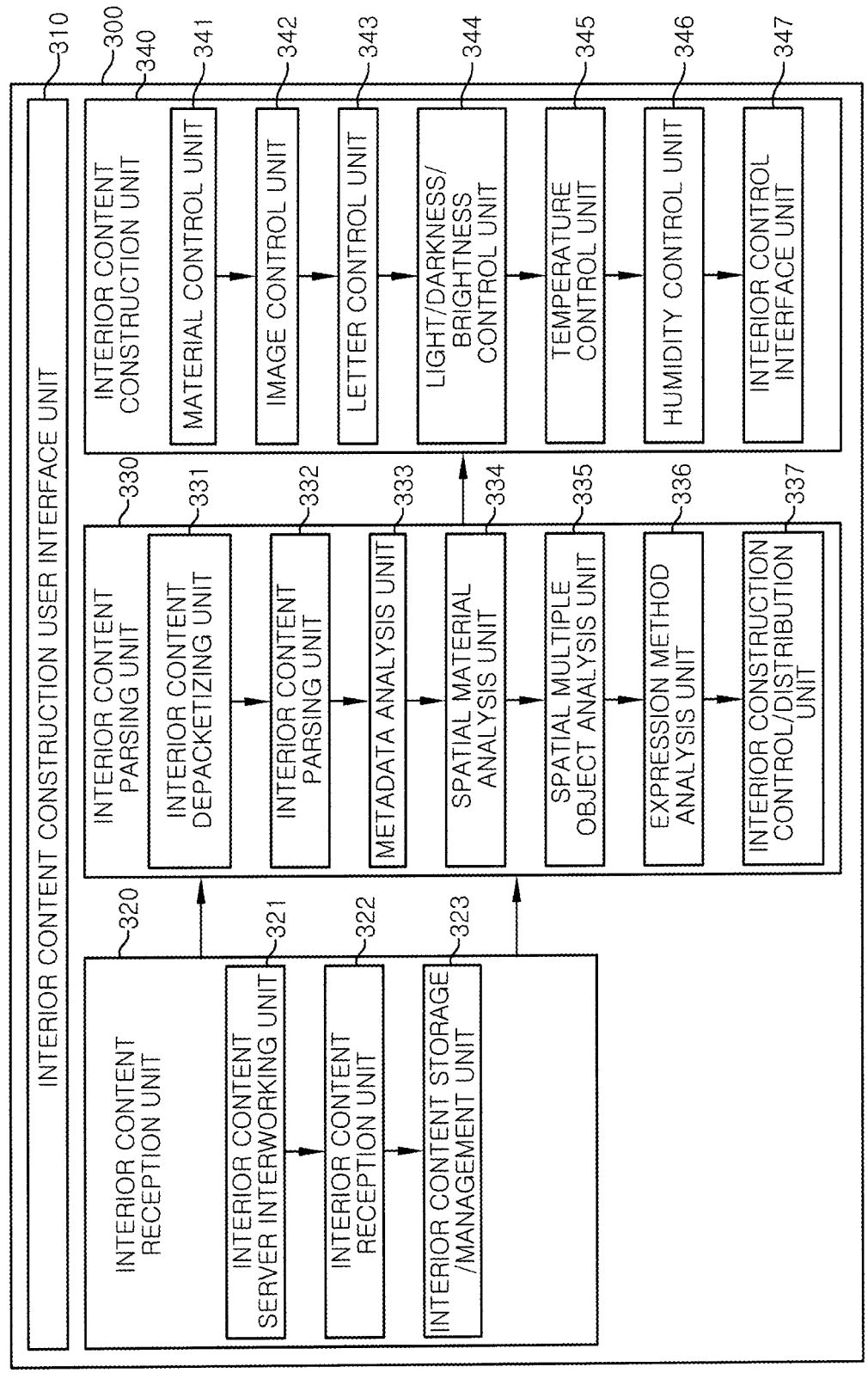
FIG. 9 is a block diagram showing the inner configuration of a digital interior construction system in accordance with the embodiment of the present invention.

The digital interior construction system 300 directly performs interior construction in the interior space using each of the pieces of interior content generated by the interior content generation system 200. For this purpose, as shown in FIG. 9, the digital interior construction system 300 includes an interior content construction user interface unit 310 for interior content construction; an interior content reception unit 320 for receiving interior content required for the interior of the space from the interior content server 243; an interior content parsing unit 330 for analyzing the interior content; and an interior content construction unit 340 for constructing the interior of the space based on the analyzed content.

The interior content reception unit 320 includes an interior content server interworking unit 321 for receiving the interior content from the interior content server 243; an interior content reception unit 322 for receiving the interior content, and an interior content storage/management unit 323 for storing and managing the received interior content.

The interior content parsing unit 330 includes an interior content depacketizing unit 331 for depacketizing the received interior content; an interior content parsing unit 332 for parsing the interior content; a metadata analysis unit 333 for analyzing metadata including the definition, standards, elements, and control method of the interior content; a spatial material analysis unit 334 for analyzing the materials used for the structure and elements of the interior space based on the metadata; a spatial multiple object analysis unit 335 for analyzing spatial multiple objects; an expression method analysis unit 336 for analyzing an interior expression method for interior construction; and an interior construction control/distribution unit 337 for mapping the analyzed content into one or more modules capable of performing the computing construction.

The interior content construction unit 340 includes a material control unit 341 for controlling one or more interior materials; an image control unit 342 for controlling one or more interior images; a letter control unit 343 for controlling one or more letters required when the interior construction is performed; a light/darkness/brightness control unit 344 for controlling the light/darkness and brightness when the interior construction is performed, temperature and humidity control units 345 and 346 for respectively controlling temperature and humidity; and an interior control interface unit 337 for transmitting one or more control commands regarding the interior construction.

Figure 10:
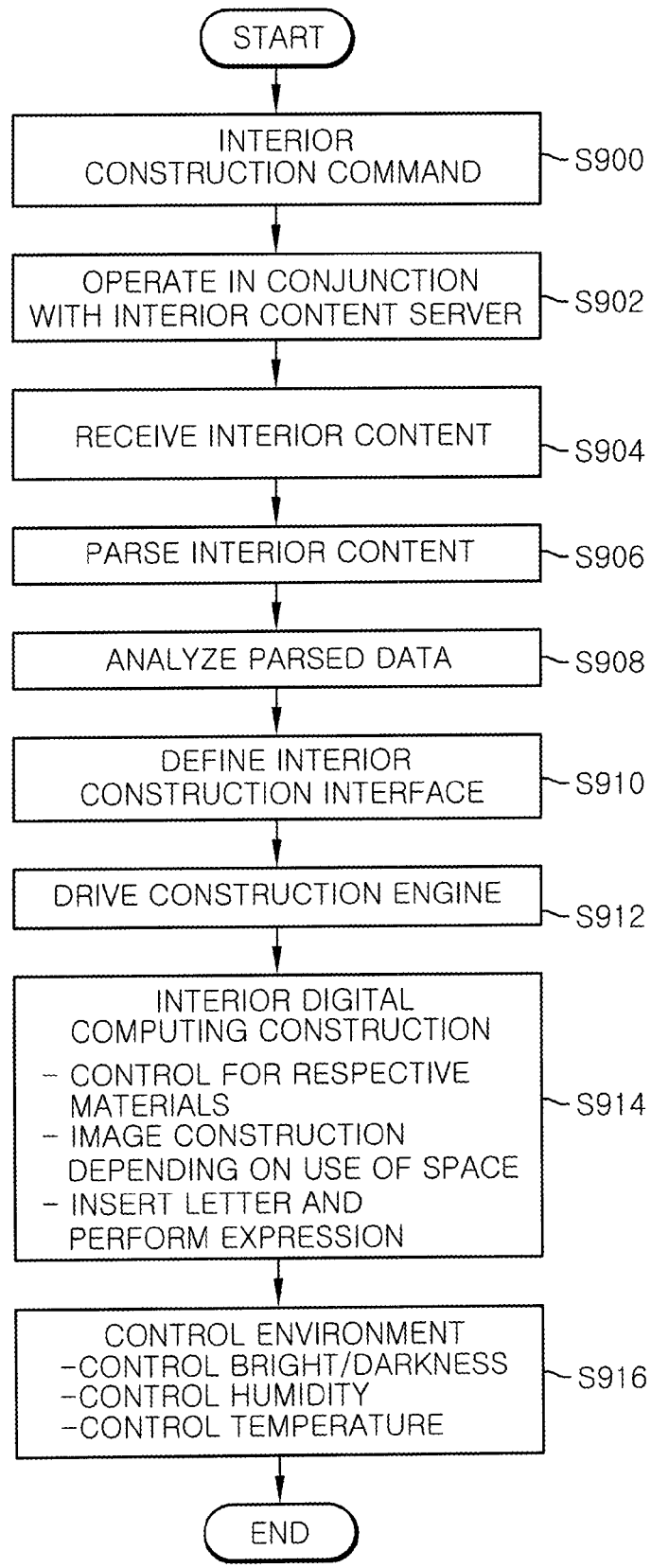
FIG. 10 is a flow chart showing a process in which the digital interior construction system in accordance with the embodiment of the present invention performs computing construction on the interior using the interior content.

FIG. 10 is a flow chart showing the process in which the digital interior construction system 300 in accordance with the embodiment of the present invention performs computing construction on the interior using the interior content.

As shown in FIG. 10, when an interior construction command is received in step S900, the digital interior construction system 300 operates in conjunction with the interior content server 243 in step S902, and requests interior content suitable for an interior space to receive the corresponding interior content in step S904.

Thereafter, the digital interior construction system 300 parses the interior content in step S906, and analyzes the parsed data in step S908.

Thereafter, the digital interior construction system 300 defines construction interfaces for the respective objects in the interior space based on the analyzed interior content in step S910, and drives the interior content construction unit 340 serving as an interior construction engine in step S912.

Accordingly, the interior content construction unit 340 performs control in the unit of objects, i.e., performs control for respective materials, performs image construction control depending on use, and performs letter insertion and expression control at step S914, and performs light/darkness control, humidity control, and temperature control of the space to control the environment in step S916.

Figure 11:
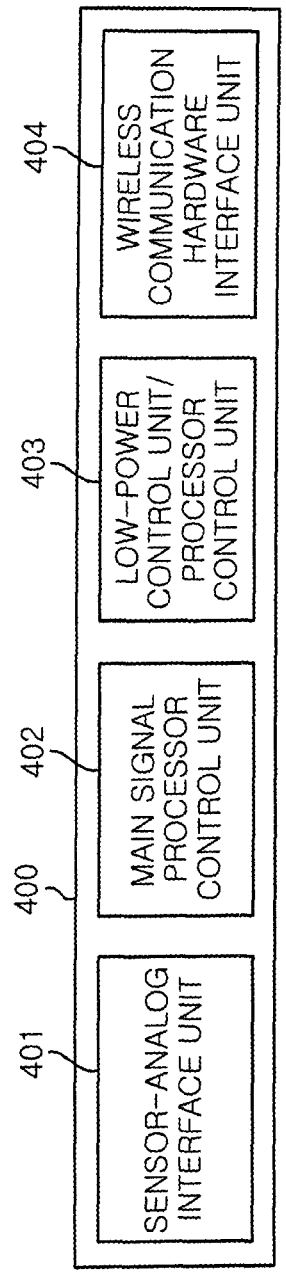
FIG. 11 is a block diagram showing the configuration of the hardware platform of the digital interior system in accordance with the embodiment of the present invention.

FIG. 11 is a block diagram showing the configuration of the hardware platform of the digital interior system in accordance with the embodiment of the present invention.

As shown in FIG. 11, the hardware platform 400 of the digital interior system in accordance with the embodiment of the present invention includes a sensor-analog interface unit 401 for sensing one or more signals of the space and environment from various kinds of sensors; a main signal processor control unit 402 for executing the software modules of a detection engine and a construction engine; a low-power control unit 403 for providing low-power services; and a wireless communication hardware interface unit 404 for transmitting and receiving one or more interior construction control signals.

Figure 12:
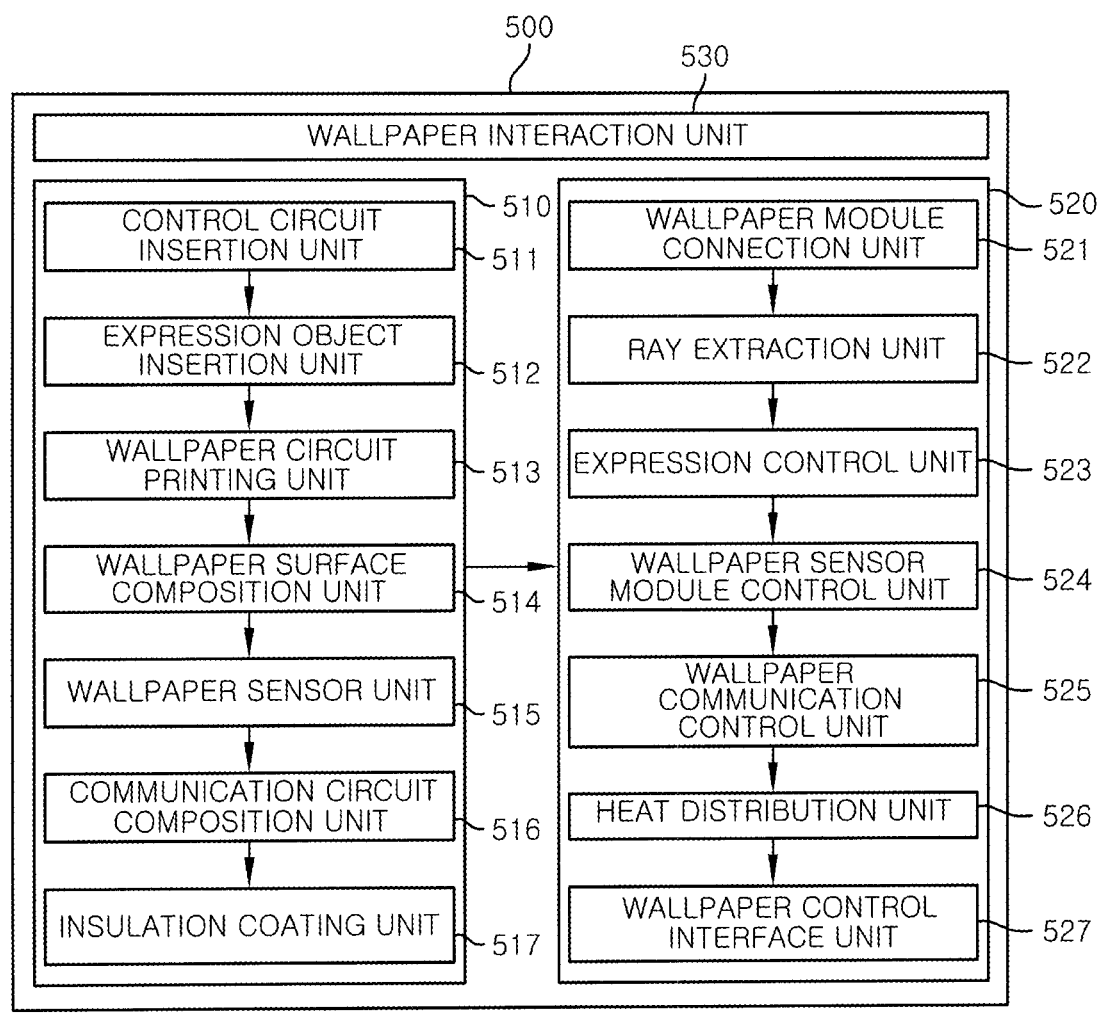
FIG. 12 is a block diagram showing the smart chameleon wallpaper providing system for configuring a smart chameleon wallpaper of the digital interior system in accordance with the embodiment of the present invention.

FIG. 12 is a block diagram showing the smart chameleon wallpaper providing system for configuring a smart chameleon wallpaper of the digital interior system in accordance with the embodiment of the present invention.

The smart chameleon wallpaper providing system 500 provides the smart chameleon wallpaper constructed or expressed in the interior space.

As shown in FIG. 12, the smart chameleon wallpaper providing system 500 includes a wallpaper generation unit 510 for generating an IT integrated smart chameleon wallpaper which is one of materials required for an interior of the interior space; a wallpaper control unit 520 for expressing images and patterns, sensing and communication; and a wallpaper interaction unit 530 for providing interaction with a user and devices.

The wallpaper generation unit 510 includes a control circuit insertion unit 511 for generating a control circuit for controlling the smart chameleon wallpaper to insert the generated control circuit in the smart chameleon wallpaper; an expression object insertion unit 512 for generating expression objects by designing the images, the patterns and colors of the smart chameleon wallpaper to insert the generated expression objects on a surface of the smart chameleon wallpaper; a wallpaper circuit printing unit 513 for printing the wallpaper circuit including the control circuit and the expression objects; a wallpaper surface composition unit 514 for constituting a surface of the smart chameleon wallpaper based on an optical fiber, e.g., a nano optical fiber, a conductive fiber and the like; a wall paper sensor unit 515 which constitutes a wallpaper sensor for sensing pieces of information of the space and environment; a communication circuit composition unit 516 for providing communication function using the smart chameleon wallpaper; an insulation coating unit 517 for insulating the surface of the smart chameleon wallpaper.

Further, the wallpaper control unit 520 includes a wallpaper module connection unit 521 for electrical connection between a smart wallpaper module, e.g., the expression object, a circuit for providing the communication function, the control circuit and the wallpaper sensor in the smart chameleon wallpaper; a ray extraction unit 522 for extracting color information from the conductive fiber; an expression control unit 523 for expressing images and patterns using the color information extracted by the ray extraction unit 522; a wallpaper sensor module control unit 524 for sensing signals from the wallpaper sensor to process and transmit the sensed signal; a wallpaper communication control unit 525 for transmitting information using the smart chameleon wallpaper; a heat distribution unit 526 for thermal management of the smart chameleon wallpaper; and a wallpaper control interface unit 527 for interaction with the digital interior construction system.

The smart chameleon wallpaper manufactured by the wallpaper control unit 520 and the wallpaper generation unit 510 which are described above is constructed or expressed by the digital interior system in the interior space.

While the invention has been shown and described with respect to the embodiments, it will be understood by those skilled in the art that various changes and modifications may be made without departing from the scope of the invention as defined in the following claims.

What is claimed is:

1. A digital interior system comprising:

a sensitivity-space-environment detection engine for collecting sensitivity information, space related information, or environmental information about an interior space, and comprising a sensitivity perception/management unit for sensing the interior space using a sensor to collect one or more sensitivity signals of the interior space and produce a sensed result, the space related information including one or more of a use, size, material, height, and width of the interior space, and the environmental information including one or more of a humidity, brightness, luminous intensity, or temperature of the interior space;

an interior content generation system for generating interior content about each of objects in the interior space based on the sensitivity information, space related information or environmental information collected by the sensitivity-space-environment detection engine;

a digital interior construction system for performing interior construction using information technology (IT) integrated objects in the interior space, the IT integrated materials being controlled according to each of one or more pieces of interior content generated by the interior content generation system; and a smart chameleon wallpaper providing system for generating an IT integrated smart chameleon wallpaper constructed in the interior space, the smart chameleon wallpaper providing system comprising:

a wallpaper providing system for generating a smart chameleon wallpaper provided in the interior space;

a wallpaper control unit for expressing images and patterns of the smart chameleon wallpaper and communicating information using the smart chameleon wallpaper; and a wallpaper interaction unit for providing interaction with a user in the interior space and devices in the interior space, wherein the sensitivity-space-environment detection engine further comprises:

the sensitivity perception/management unit configured to extract an individual sensitivity index for each of the objects which constitute the interior space using the sensed result, extract a common sensitivity index using the extracted individual sensitivity index, and manage the individual sensitivity index and the common sensitivity index as the sensitivity information;

a space perception/management unit configured to detect a model and a structure of the interior space using information about structure and configuration obtained by sensing the interior space and information about the structure and configuration of the interior space received through a user interface, and collect the space related information using the detected model and structure; and an environment perception/management unit configured to collect the environmental information about the interior space by sensing one or more of environmental signals of the interior space, wherein the sensitivity perception/management unit comprises:

a multi-channel sensor unit configured to sense the interior space and to collect one or more sensitivity signals of the interior space, the multi-channel sensor unit including the sensor;

a sensitivity sensing information management unit configured to analyze the sensitivity signal, extract one or more elements which affect the interior space, and managing the elements;

a spatial sensitivity element extraction unit configured to extract the individual sensitivity index for each of the objects in the interior space using the elements managed by the sensitivity sensing information management unit; and a common sensitivity index conclusion unit configured to extract the common sensitivity index for the interior space based on the individual sensitivity index, and manage the individual sensitivity index and the common sensitivity index as the sensitivity information, wherein the space perception/management unit comprises:

a spatial structure perception unit configured to detect the model and structure of the interior space by analyzing the sensed and received information about the structure and configuration of the interior space;

a spatial use perception unit configured to analyze a use of the interior space by analyzing the received information about the structure and configuration of the interior space;

a spatial material perception unit configured to perceive materials of the interior space by analyzing the sensed and received information about the structure and configuration of the interior space;

a spatial size perception unit configured to detect a size of the interior space by analyzing height and width of the interior space based on the sensed and received information about the structure and configuration of the interior space; and a spatial information management unit configured to store and manage at least one or more of use, structure, size, material, height, and width of the interior space as the space related information, wherein the environment perception/management unit comprises:

a humidity perception unit configured to perceive humidity of the interior space;

a light/darkness perception unit configured to perceive the light/darkness of the interior space;

a temperature and season perception unit configured to perceive a temperature and a season of the interior space; and an environmental information management unit configured to store and manage at least one or more of perceived humidity, bright/darkness, temperature, and season as the environmental information, and wherein the smart chameleon wallpaper is based on an optical fiber.

2. The digital interior system of claim 1, wherein the interior content generation system comprises:

an interior element management unit for configuring and managing one or more elements required when the interior construction is performed in the interior space;

an interior content generation unit for generating and manufacturing the interior content based on the elements; and an interior content management unit for storing and transmitting the interior content generated and manufactured by the interior content generation unit.

3. The digital interior system of claim 2, wherein the interior element management unit comprises:

a purposive content element management unit for managing one or more purposive content elements from among the required elements;

a material content element management unit for managing one or more material content elements from among the required elements;

an age content element management unit for managing one or more age content elements from among the required elements;

a sexual content element management unit for managing one or more sexual content elements from among the required elements;

a seasonal content element management unit for managing one or more seasonal content elements from among the required elements;

a size content element management unit for managing one or more size content elements from among the required elements; and a shape and structure content element management unit for managing one or more shape and structure content elements from among the required elements.

4. The digital interior system of claim 2, wherein the interior content generation unit comprises:

an interior component generation unit for generating one or more interior components required to generate the interior content;

an interior design unit for designing a shape, expression, color, or image for each of the objects in the interior space;

an interior graphic unit for performing a graphic process based on design content for each of the objects, which has been designed by the interior design unit;

an interior content formatting unit for defining a format of each of pieces of the interior content;

an interior content generation unit for generating the interior content for each of the objects based on the defined format; and an interior content authoring unit for authoring the generated interior content for each of the objects into interior content suitable for the interior space using a predefined authoring tool.

5. The digital interior system of claim 1, wherein the digital interior construction system comprises:

an interior content reception unit for requesting the interior content required for the interior construction in the interior space from the interior content generation unit, and receiving the interior content;

an interior content parsing unit for analyzing the received interior content; and an interior content construction unit for directly performing interior construction in the interior space based on the analyzed interior content.

6. The digital interior system of claim 5, wherein the interior content parsing unit comprises:

a depacketizing unit for depacketizing the received interior content;

a parsing unit for parsing the depacketized interior content;

a metadata analysis unit for analyzing metadata of the parsed interior content;

a space analysis unit for analyzing materials of structure and one or more elements of the interior space based on the metadata;

a multiple object analysis unit for analyzing multiple objects in the interior space;

an interior expression method analysis unit for analyzing an interior expression method when the interior construction is performed; and an interior construction control/distribution unit for mapping into one or more modules capable of performing the computing construction based on the materials of the structure and elements, multiple objects, and the interior expression method.

7. The digital interior system of claim 5, wherein the interior construction unit comprises:

a material control unit for controlling one or more interior materials when the interior construction is performed using the interior content;

an interior image control unit for controlling one or more interior images when the interior construction is performed using the interior content;

an interior light/darkness and brightness control unit for controlling interior light/darkness and brightness when the interior construction is performed using the interior content;

an interior humidity control units for controlling interior humidity when the interior construction is performed using the interior content; and an interior control interface unit for transmitting one or more control commands for the interior construction.

8. The digital interior system of claim 1, the wallpaper generation unit comprising:

a control circuit insertion unit configured to generate a control circuit for controlling the smart chameleon wallpaper and to insert the generated control circuit in the smart chameleon wallpaper;

an expression object insertion unit configured to generate expression objects by designing the images, the patterns and colors of the smart chameleon wallpaper and to insert the generated expression objects on a surface of the smart chameleon wallpaper;

a wallpaper circuit printing unit for printing a wallpaper circuit including the control circuit and the expression objects;

a wallpaper surface composition unit configured to construct a surface of the smart chameleon wallpaper;

a wallpaper sensor unit configured to construct a wallpaper sensor for sensing pieces of information of the interior space and the environment of the interior space;

a communication circuit composition unit for providing a communication circuit for providing communication function using the smart chameleon wallpaper; and an insulation coating unit for insulating the surface of the smart chameleon wallpaper.

9. The digital interior system of claim of 8, the wallpaper control unit comprising:
- a wallpaper module connection unit for electrical connection between the expression object, the control circuit, the communication circuit, and the wallpaper sensor in the smart chameleon wallpaper;
- a ray extraction unit for extracting color information from the conductive fiber;
- an expression control unit for expressing images and patterns using the color information extracted by the ray extraction unit;
- a wallpaper sensor module control unit for sensing signals from the wallpaper sensor to process and transmit the sensed signal;
- a wallpaper communication control unit for controlling transmission of information using the smart chameleon wallpaper;
- a heat distribution unit for thermal management of the smart chameleon wallpaper; and
- a wallpaper control interface unit for interaction with the digital interior construction system.

10. A method for controlling a digital interior system, the method comprising:
- collecting sensitivity information, space related information, or environmental information by sensing an interior space using a sensor to collect one or more sensitivity signals of the interior space, the space related information including one or more of a use, size, material, height, and width of the interior space, and the environmental information including one or more of a humidity, brightness, luminous intensity, or temperature of the interior space;
- generating interior content for each of one or more information technology (IT) enabled objects in the interior space based on the collected sensitivity information, space related information, or environmental information; and
- performing interior construction in the interior space using each generated piece of interior content, wherein performing interior construction includes controlling an appearance other than a brightness of the IT enabled objects in the interior space according to the respective pieces of interior content,
- wherein collecting sensitivity information includes extracting an individual sensitivity index for each of the objects which constitute the interior space using the sensed result, extracting a common sensitivity index using the extracted individual sensitivity index, and managing the individual sensitivity index and the common sensitivity index as the sensitivity information,
- wherein collecting space related information includes detecting a model and a structure of the interior space using information about structure and configuration obtained by sensing the interior space and information about the structure and configuration of the interior space received through a user interface, and collecting the space related information using the detected model and structure, and
- wherein collecting environmental information includes collecting the environmental information about the interior space by sensing one or more of environmental signals of the interior space,
- wherein collecting sensitivity information further includes sensing the interior space using a multi-channel sensor unit including the sensor, analyzing the sensitivity signal, extracting one or more elements which affect the interior space, managing the elements, extracting the individual sensitivity index for each of the objects in the interior space using the managed elements, and extracting the common sensitivity index for the interior space based on the individual sensitivity index,
- wherein collecting space related information further includes detecting the model and structure of the interior space by analyzing the sensed and received information about the structure and configuration of the interior space, analyzing a use of the interior space by analyzing the received information about the structure and configuration of the interior space, perceiving materials of the interior space by analyzing the sensed and received information about the structure and configuration of the interior space, detecting a size of the interior space by analyzing height and width of the interior space based on the sensed and received information about the structure and configuration of the interior space, and storing and managing at least one or more of use, structure, size, material, height, and width of the interior space as the space related information,
- wherein collecting environmental information further includes perceiving a humidity of the interior space, perceiving the light/darkness of the interior space, perceiving a temperature and a season of the interior space, and storing and managing at least one or more of perceived humidity, bright/darkness, temperature, and season as the environmental information, and
- wherein the digital interior system includes a smart chameleon wallpaper based on an optical fiber.

11. The method of claim 10, wherein the generating the interior content comprises:
- generating one or more interior components required to generate the interior content;
- designing a shape, expression, color, or image of each of the objects in the interior space;
- performing a graphic process based on designed content for each of the objects;
- defining a control method for each of the objects;
- defining a format of the interior content;
- generating interior content for each of the objects based on the defined format; and
- authoring the generated interior content for each of the objects into interior content suitable for the interior space using a predefined authoring tool.

12. The method of claim 10, wherein the performing the interior construction comprises:
- depacketizing the interior content;
- parsing the depacketized interior content;
- analyzing metadata of the parsed interior content;
- analyzing one or more materials of one or more structures and elements of the interior space based on the metadata;
- analyzing multiple objects of the interior space;
- analyzing an interior expression method when the interior construction is performed; and
- performing the interior construction based on the materials of the structures and elements of the interior space, the multiple objects, and the interior expression method.

* * * * *